July 6, 1954 W. A. RHOADES, JR 2,682,866
BALANCED FUEL-AIR RATIO CONTROLLER FOR GAS ENGINES
Filed Nov. 27, 1953 4 Sheets-Sheet 1

INVENTOR
Warren A. Rhoades Jr.
By Owen & Owen
ATTORNEYS

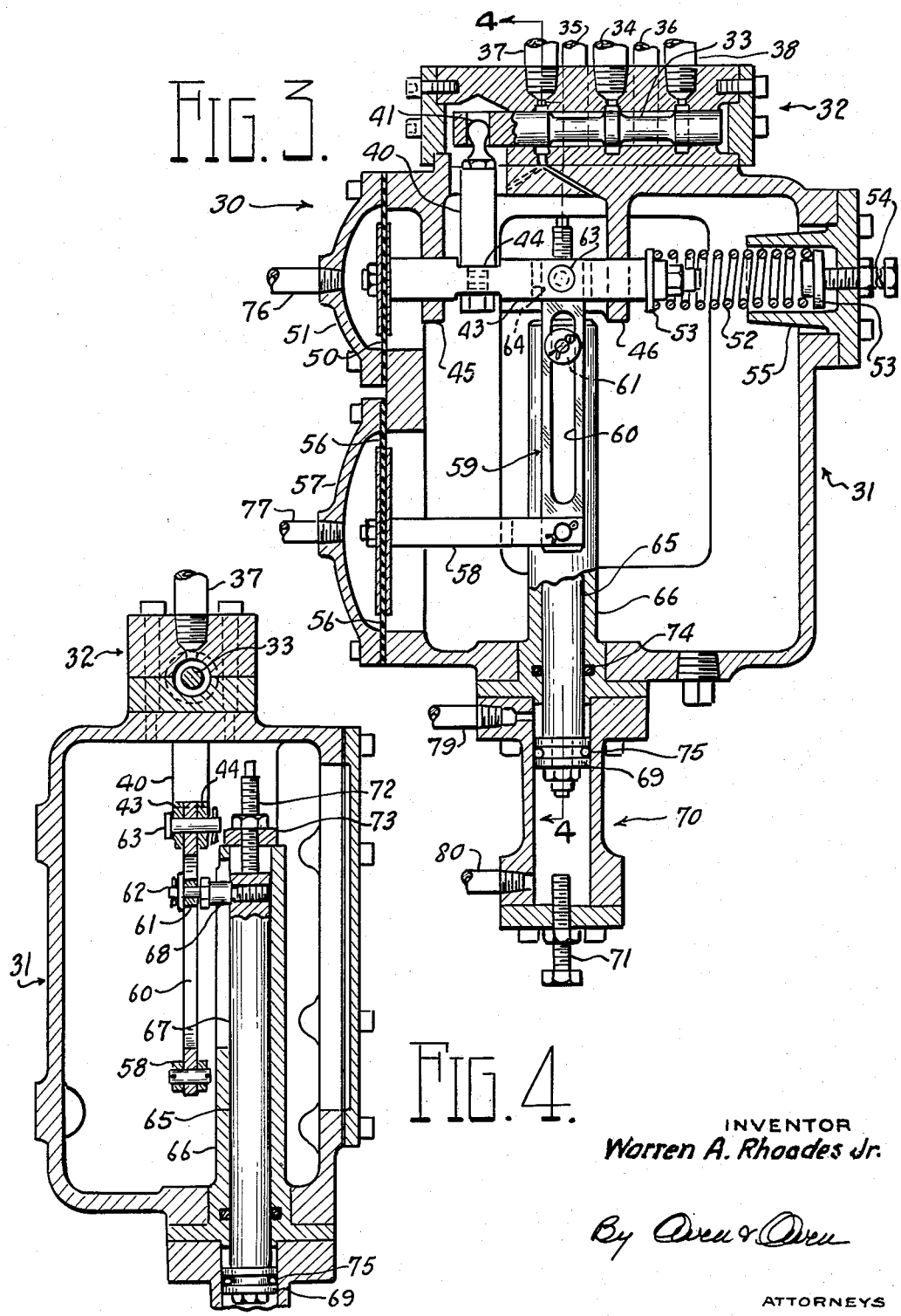

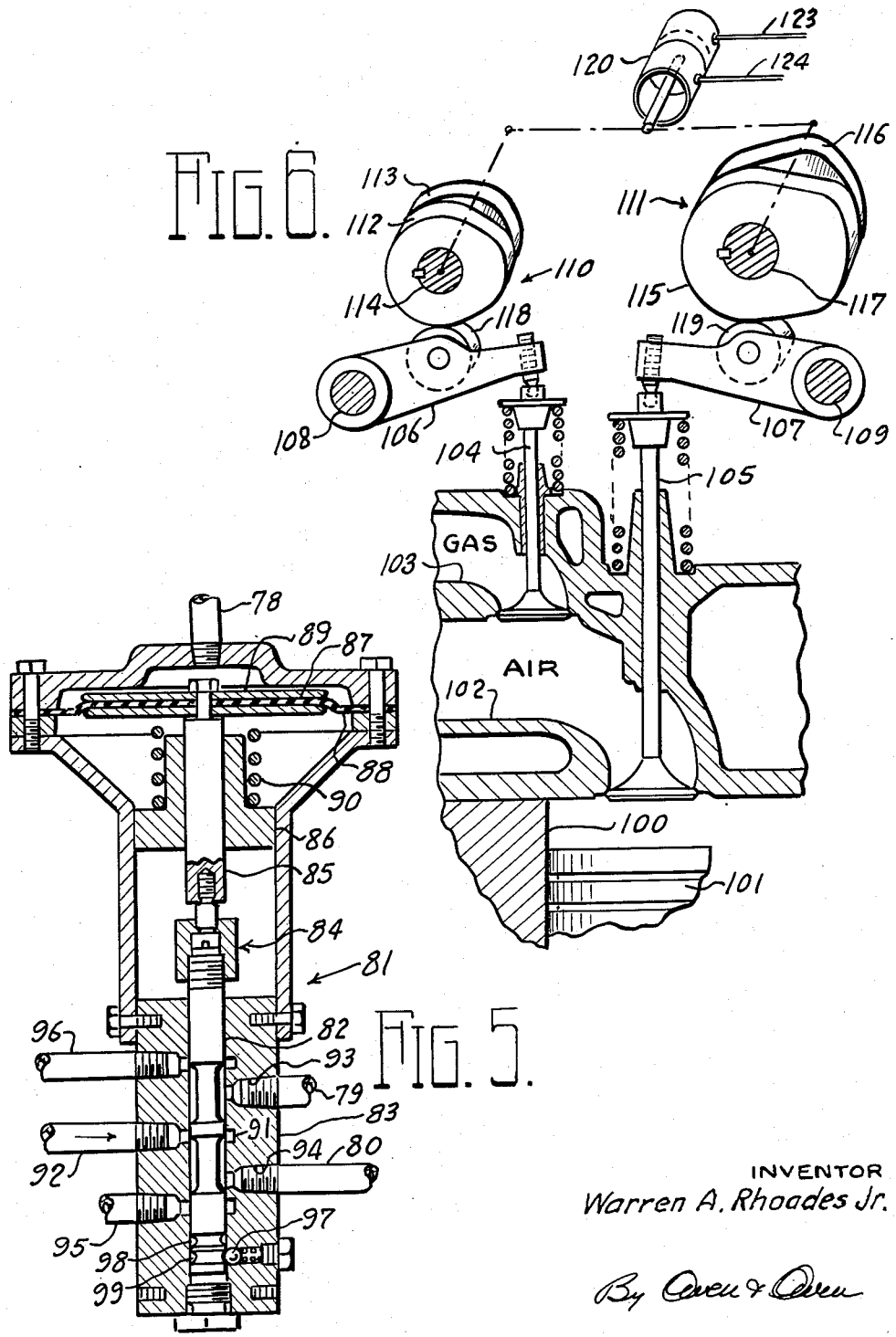

July 6, 1954 W. A. RHOADES, JR 2,682,866
BALANCED FUEL-AIR RATIO CONTROLLER FOR GAS ENGINES
Filed Nov. 27, 1953 4 Sheets—Sheet 4

INVENTOR
Warren A. Rhoades Jr.
BY
ATTORNEYS

Patented July 6, 1954

2,682,866

UNITED STATES PATENT OFFICE 2,682,866

BALANCED FUEL-AIR RATIO CONTROLLER FOR GAS ENGINES

Warren A. Rhoades, Jr., Mount Vernon, Ohio, assignor to The Cooper-Bessemer Corporation, Mount Vernon, Ohio, a corporation of Ohio Application November 27, 1953, Serial No. 394,801

11 Claims. (Cl. 123—120)

This invention relates to controls for internal combustion engines and is particularly directed to a control for engines in which gas makes up all or most of the fuel. The engine may be either supercharged or naturally aspirated.

The primary object of the invention is to provide a control for an engine in which gas is used as a fuel which will automatically maintain the proper fuel-air ratio during operation over a wide range of engine loads.

It is a further object of this invention to provide a pressure balancing means for balancing the pressures in fuel and air manifolds of a gas engine and for controlling the increase or decrease of air pressure in response to unbalanced conditions between the pressures caused by changes in the gas pressure resulting from changes in loads on the engine.

It is a further object of this invention to provide means responsive to changes in gas manifold pressure for initiating corresponding changes in air pressure which means is counterbalanced by means responsive to the air manifold pressure when the correct fuel-air ratio is established.

It is yet another object of this invention to provide apparatus for maintaining a desired fuel-air ratio under certain operating conditions of a gas engine and for changing the control to a different predetermined fuel-air ratio at the time of a change in load conditions on the engine.

It is yet another object of this invention to provide apparatus for actuating the cam shifting mechanism of a shifting cam shaft engine and for simultaneously modifying a fuel-air ratio control means to maintain a ratio approximate for the particular cam shaft setting in use.

In the operation of gas engines, or of gas-diesel engines in which the fuel is partially gas and partially injected oil, it has been found that there is an almost linear relationship between the quantity of gas entering the engine and the quantity of air best suited to be burned with the gas in the combustion cycle. It has also been found that operation at greater-than-atmospheric pressures changes the slope of the line representing air manifold pressure plotted against gas header pressure. Thus, for an engine that can be operated either as supercharged or naturally aspirated, two separate ratios appear to be required in order that operation over the desired wide range can be assured.

The present invention comprises a means to sense both the existing gas header pressure and air manifold pressure and, in accordance with the relationship therebetween, to control the setting of a valve in the air manifold to maintain a predetermined fuel-air ratio in the mixture that enters the engine cylinder. In the preferred embodiment, the pressure responsive sensing members operate differentially to move a servo-pilot valve, the servo-motor being associated with an air quantity control device. The invention also includes means to vary the ratio at which the differentially operating sensing members reach a position of balance, said means operating in response to a predetermined level of air manifold pressure.

In the drawings:

Fig. 3 is a vertical sectional view through pressure balancing means embodying the instant invention.

Fig. 4 is a vertical sectional view of the means shown in Fig. 3 taken substantially on the line 4—4 of Fig. 3.

Fig. 5 is a vertical sectional view of air manifold pressure actuated means employed in connection with the mechanism illustrated in Figs. 3 and 4.

Fig. 6 is a diagrammatic view partly in section and partly in perspective of the inlet valve gear of a shifting cam shaft engine to which the present invention may be applied.

Figure 1:
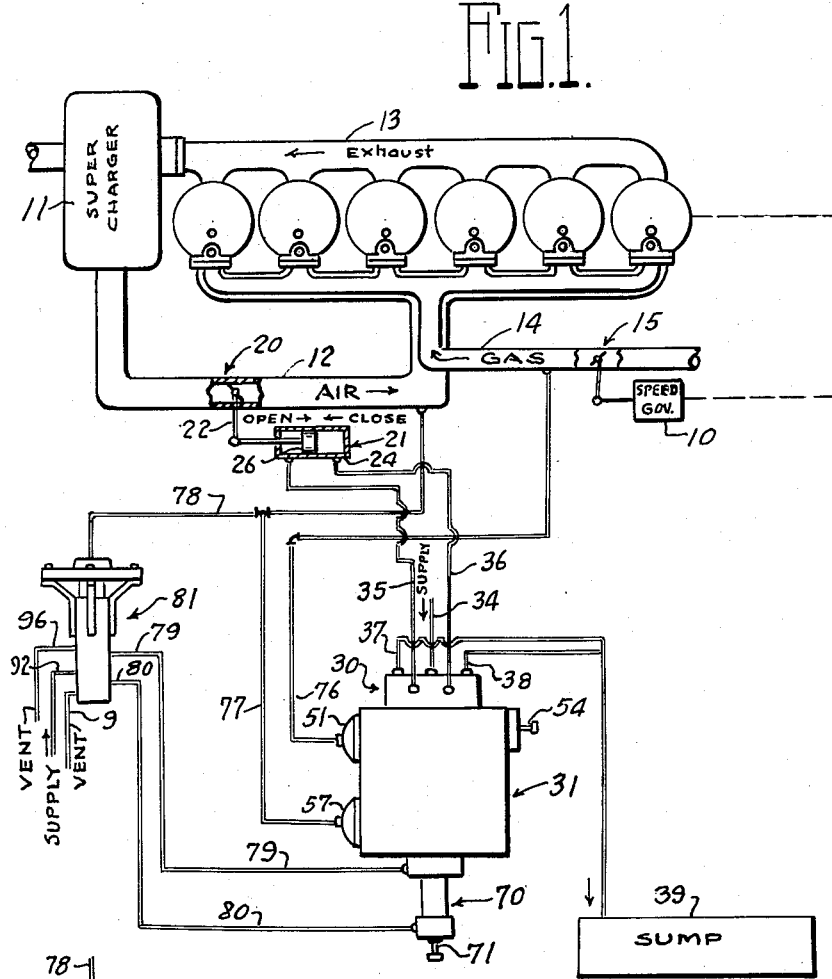
Fig. 1 is a circuit diagram illustrating how an embodiment of the invention is employed for the control of a supercharged gas engine.

In the form shown diagrammatically in Fig. 1, the engine is illustrated as a constant speed machine under the control of a governor 10. Air is supplied to the engine by a supercharger 11 feeding an air manifold 12, power for the supercharger being taken from any suitable source such as an exhaust manifold 13. The gas supply header is indicated at 14, flow therein being controlled by any suitable valve, such as a butterfly 15 which is actuated by the governor 10 in such a manner that when the load on the engine increases, the gas supply valve 15 is opened to admit more gas and thus increase the power developed by the engine to pick up the increased load. The increase of gas thus supplied requires that the air supplied to the engine be likewise increased in a definite ratio.

The supply of air to the manifold 12 is controlled by an air control butterfly valve 20 and a servo-motor 21 may be used to operate the valve 20 through appropriate linkage 22. The servo-motor 21 may consist of a double acting cylinder 24 having a piston 26 therein connected to the linkage 22. The servo-motor cylinder 24 is connected to a pilot valve operated by a manifold pressure regulator, designated 30.

The manifold pressure regulator 30 which is shown in Figs. 3 and 4 comprises a housing 31 carrying a pilot valve body 32 at its upper side in which a spool-type pilot valve 33 is reciprocated. The pilot valve 32 in one position connects a fluid supply line 34 with an outlet line 35 to one end of the servo-motor cylinder 24, and in its other position connects the supply line 34 with a second outlet line 36 to the opposite end of the servo-motor cylinder 24. The outlet line not connected to the supply is drained through one of a pair of vent lines 37 or 38 to a sump 39.

The pilot valve 33 is actuated by a stem 40 having a ball head portion 41 received in a hole 42 in the pilot valve body 33. At its lower end the stem 40 is threaded into a reciprocable rod 43 against a flat 44 on the rod. The rod 43 is supported and guided in its reciprocation by any suitable means such as bored depending flanges 45 and 46 formed on the housing 31.

The motion of the rod 43, and thus of the pilot valve 33, is the resultant of forces created at three places. An upper gas diaphragm 50 which is located in a gas pressure dome 51 is attached directly to the left end (Fig. 3) of the rod 43. The force created in the dome 51 is opposed by a spring 52 which is located at the right of the rod 43 and extends between a rod cap 53 and an adjustably positionable bearing plate 53. A positioning screw 54 is threaded in a socket plate 55 mounted in the housing 31 and holds the plate 53 in adjusted position so that the force of the spring 52 against the end of the rod 43 opposite the diaphragm 50 may be adjusted and set for particular operating conditions. An air diaphragm 56 is located in an air pressure dome 57 located below the gas dome 51. The diaphragm 56 has a strut 58 which is bifurcated at its free end and pivotally connected by a pin 58 to the lower end of a balancing lever 59.

The balancing lever 59 is longitudinally slotted forming a guideway 60 in which a guide block 61 slides. The guide block 61 is carried on a pin 62 that serves as a fulcrum for the lever 59. The upper end of the lever 59 is pivotally connected by a pin 63 to the rod 43, the end of the lever 59 extending through a slot 64 in the rod 43. Force created in the air pressure dome 57 and acting through the diaphragm 56 is transmitted through the strut 58 to the balancing lever 59 tending to swing it in a counterclockwise direction and to slide the rod 43 and thus pilot valve 33 to the left. On the other hand, forces created in the gas pressure dome 51 and acting through the diaphragm 50 tend to slide the rod 43 and pilot valve 33 to the right against the compression of the spring 52.

The pin 62 serves as a fulcrum for the balancing lever 59 and it can be slid along the guideway 60 to change the fulcrum point of the lever 59 and thus to change the resultant between the forces created in the gas and air pressure domes 51 and 57 and its action of the rod 43 and pilot valve 33. The pin 62 is studded into the upper end of a vertically reciprocable rod 65 which slides in an elongated tubular guide 66 secured in and extending upwardly from the bottom of the housing 31. The guide 66 (Fig. 4) has a vertical slot 67 generally aligned with the slot 60 and through which a cylindrical portion 68 of the pin 62 extends.

The lower end of the rod 65 mounts a piston 69 which slides in a vertically extending double acting cylinder 70 secured on the bottom of the housing 31. Vertical movement of the rod 65 is effected by the balance of pressure in the cylinder 70 above or below the piston 69 and the extent of movement of the rod 65 is limited by a pair of adjustable stop bolts 71 at the bottom of the cylinder 70 and 72 at the top of the guide 66. The stop screw 72 is threaded through a web 73 formed between the depending flanges 45 and 46. An O-ring 74 seals the rod 65 in the guide 66 and a similar O-ring 75 on the piston 69 seals the piston 69 in the cylinder 70.

The gas pressure dome 51 (Fig. 3) is connected by a gas line 76 (see also Fig. 1) directly to the gas manifold 14. Similarly the air pressure dome 57 is connected by a line 77 to a line 78 and to the air manifold 12. The upper end of the double acting cylinder 70 is connected by a line 79 and the lower end of the cylinder 70 is connected by a line 80 to an air pressure responsive shifting valve generally indicated at 81 (see also Fig. 5. The shifting valve 81 has a spool-type valve plunger 82 vertically reciprocable in a valve cylinder 83 and connected at its upper end through a lost motion connector 84 to the lower end of a diaphragm strut 85. The diaphragm strut 85 is vertically slidable in a cap 86 and secured by pressure plates 87 to a diaphragm 88 mounted across the bottom of a pressure chamber 89. The pressure chamber 89 is connected by the line 78 directly to the air manifold 12. A coil spring 90 extends between the cap 86 and the lower one of the pressure plates 87 tending to thrust the diaphragm 88 and, consequently, the valve plunger 82 upwardly.

The valve plunger 82 has a central land 91 which operates to control fluid flow from a supply line 92 to the lines 79 and 80 leading to the double acting cylinder 70 (see Fig. 3). When the plunger 82 is in its lower position (Fig. 5) the supply line 92 is connected past the land 91 to an upper port 93 and to the line 79 to the upper end of the double acting cylinder 70 and the line 80 from the upper end of the double acting cylinder 70 is connected through its port 94 to a vent line 95. Similarly, when the valve plunger 82 is in its upper position the supply line 92 is connected to the lower port 94 and the line 80 to the lower end of the double acting cylinder 70 and the line 79 is connected to an upper vent line 96.

The pressure responsive shifting valve 81 thus functions to alternately supply and vent the two lines 79 and 80 connected to the double acting cylinder 70 and thus to shift the rod 65 (Fig. 4) vertically, changing the position of the fulcrum pin 61 of the balancing lever 59 when the pressure in the air manifold 12 passes a predetermined level. The pressure responsive shifting valve 81 does not function to proportion pressure between its outlet lines 79 and 80 but is intended to be shifted positively from one position to the other. Preferably, therefor, means are provided for positively positioning its plunger 82 in either of the two positions explained. In Fig. 5 these means are indicated as a spring pressed detent ball 97 alternately engaged in a pair of spaced peripheral grooves 98 and 99 cut in the lower end of the plunger 82.

In the circuit illustrated in Fig. 1 the lines 79 and 80 are connected to the upper and lower ends, respectively, of both the double acting cylinder 70 and the valve cylinder 83. Fig. 1 illustrates the operation of apparatus embodying the invention for the control of an engine employing a single set of cams for controlling the gas and air valves supplying the cylinders. With the lines 79 and 80 connected as shown, low pressure in the air manifold 12 allows the spring 90 (Fig. 5) to thrust the diaphragm 88 upwardly moving the valve plunger 82 upwardly into the position shown in Fig. 5 and connecting the inlet line 92 to the port 94 and the conduit line 80. This admits pressure beneath the piston 69 (Fig. 3) and thrusts the rod 65 into the upper position illustrated in Fig. 3. Conversely, when pressure in the air manifold 12 exceeds a predetermined level (zero p. s. i. g.) the diaphragm 88 is thrust downwardly against the pressure of the spring 90, connecting the inlet line 92 to the port 93 and the conduit line 79. This admits pressure above the piston 69 thrusting the rod downwardly and shifting the fulcrum pin 61 to its lower position determined by the setting of the stop screw 71.

Operation

In the operation of a gas engine it has been determined that at low load, i. e., where low gas pressure is present in the gas manifold and, correspondingly, low air pressure required in the air manifold, for any given increase in pressure in the gas manifold resulting from an increased load on the engine and the consequent opening of the gas control butterfly 15 by the governor 10, a proportionately lower increase in the air manifold is required for proper combustion than is true under heavy load conditions. The apparatus of the invention functions therefore not only to control the air pressure in the manifold 12 in accordance with gas pressure in the gas manifold 14 and thus to maintain the proper fuel air ratio but also to provide for two different control ratios depending upon the load on the engine. Assuming first that the load on the engine is low and referring to Fig. 7, it will be seen that in the operation of a particular engine which is graphed in Fig. 7, it has been found most effective to shift the ratio between gas and air manifold pressure when the air manifold pressure passes zero (gauge). When the air manifold pressure is negative, Fig. 7 reveals that a proper balance between air and gas exists when the air manifold pressure changes approximately one-half as much in pounds per square inch as the gas pressure changes. Under these circumstances the apparatus of Figs. 3 and 4 maintains a balance between the gas and air pressure and the changes therein in the following manner. When the load on the engine increases and, consequently, the governor opens the butterfly 15 to increase the gas pressure in the manifold 14, the gas pressure in the gas pressure dome 51 also increases (Fig. 3). This thrusts the diaphragm 50 and the rod 43 to the right and slides the pilot valve 33 to the right. This connects the pressure line 34 with the line 35 leading to the left side of the piston 26 of the air butterfly control servomotor 21. This opens the butterfly 20 increasing the pressure in the manifold 12. When the pressure in the manifold 12 rises it increases the pressure in the air dome 57 which thrusts the diaphragm 56 to the right, and when a proper increment of increase in air pressure has been achieved, the force exerted on the air pressure diaphragm 56 becomes high enough to counteract the force being exerted on the gas pressure diaphragm 50 and to swing the balancing lever 59 to move the rod 43 to the left and restore the pilot valve 33 to its central position.

It will be observed that under these conditions (relatively low manifold pressure and low load) the rod 65 is in its uppermost position and the fulcrum pin 61 is closer to the rod 43 than it is to the strut 58. This gives the air pressure diaphragm 56 a mechanical advantage so that a lesser change in pressure in the air dome 57 counterbalances a higher change in the gas dome 51. The ratio between the lever arms of the balancing lever 59 at this point establishes the ratio of that portion of the curve in Fig. 7 which lies between zero and about 8.5 inches of gas manifold pressure which corresponds to zero air manifold pressure. (All pressures in Figs. 7 and 8 are guage pressures measured in inches of mercury.)

When the load on the engine increases above a level where an air manifold pressure of zero p. s. i. g. is required, an increase in gas pressure brought about by the speed governor 10 actuates the pilot valve 33 as above explained to open the air butterfly 20 and increase the air manifold pressure. At this point, however, the air manifold pressure reaches a level high enough to overcome the spring 90 (Fig. 3) and thrust the valve plunger 82 downwardly connecting the pressure line 92 to the upper conduit line 79 and to the upper end of the double acting cylinder 70. This thrusts the piston 69 downwardly pulling the rod 65 and the fulcrum pin 61 downwardly to the position determined by the stop 71. With the fulcrum pin 61 lowered, the ratio between the lever arms of the balancing lever 69 is changed and it then requires a greater change in air manifold pressure acting through the air pressure diaphragm 56 to counterbalance an increment of increase in gas pressure acting through the gas pressure diaphragm 50.

Figure 7:
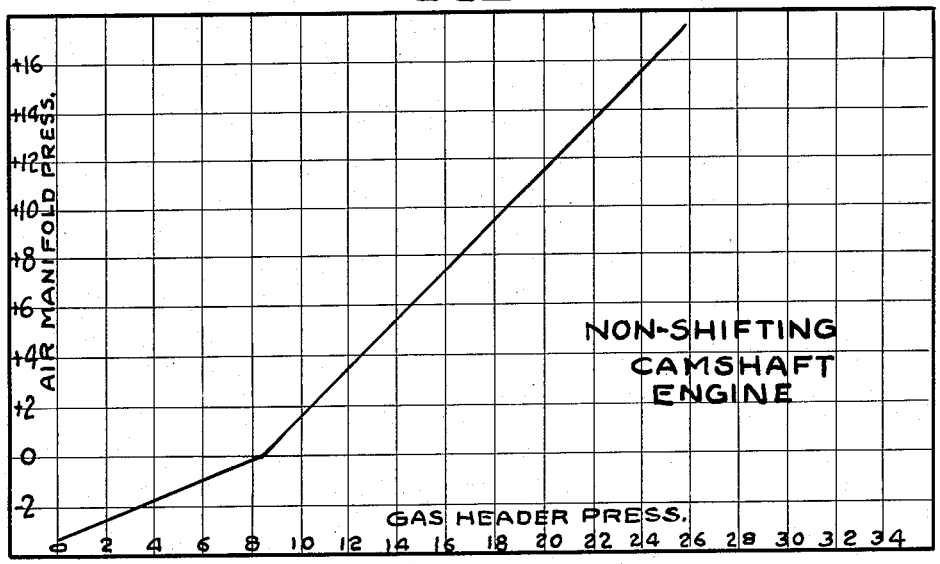
Fig. 7 is a graph of gas header pressure versus air manifold pressure of a supercharged engine, not employing a cam shaft shifting mechanism, as controlled by mechanism embodying the invention.
Figure 8:
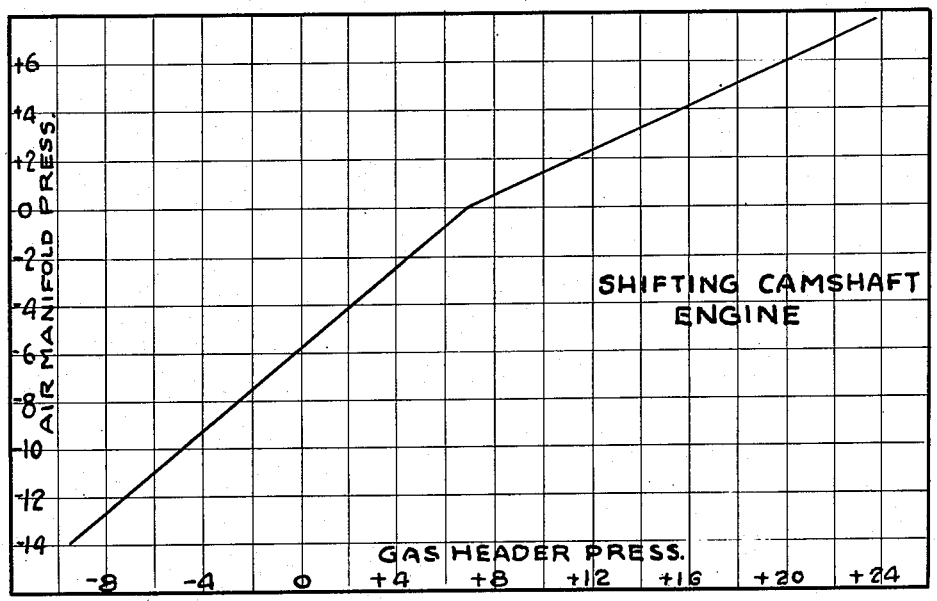
Fig. 8 is a graph similar to Fig. 7 but of the air and gas pressures of a cam shaft shifting type engine, as controlled by mechanism embodying the invention.

When the fulcrum pin 61 is shifted downwardly into heavy load range, the slope of the curve in Fig. 7 changes correspondingly and as gas presure continues to increase under continued increases in loads, air presure is increased responsive thereto in larger increments relative to each increment of increase in gas pressure.

By testing any particular engine, operating with any particular type of fuel, the positions of the stop pins 71 and 72 can be determined to establish the low air pressure position (upper position of the fulcrum pin 61) and the high air pressure position (lower position of the fulcrum pin 61) to provide for appropriate leverage between the diaphragms 50 and 56 acting on the rod 43 and pilot valve 33. Adjustment of the screw 54 in combination with the ratio of the areas of the two diaphragms 50 and 56 establishes the sensitivity and speed of response of the air pressure control means for given changes in gas presure.

Shifted cam shaft engines

The problems of changing the fuel air ratios in a gas engine as required for light and heavy loads has been attacked in some cases by the use of two alternately employed sets of valve cams. An engine so equipped is generally referred to as a shifting cam shaft engine and the essential apparatus for shifting the valve cams is shown fragmentarily and in perspective in Fig. 6. In Fig. 6 there is illustrated the upper portion of an engine cylinder 100 with a fragment of a piston 101 shown therein. The engine has a branch 102 of its air manifold and a branch 103 of its gas manifold arranged to be controlled by a pair of valves 104 and 105 respectively. The valves 104 and 104 are actuated by valve rocker arms 106 and 107 mounted upon rocker shafts 108 and 109 and actuated by pairs of cams 110 and 111. Each set of gas and air valves 104 and 105 is provided with a pair of cams 110 and cams 111. The cams 110 consist of a light load cam 112 and a heavy load cam 113 mounted adjacent the cam 112 on the cam shaft 114. Similarly the set 111 of air cams consists of a light load cam 115 and an adjacent heavy load cam 116 both mounted side by side upon the cam shaft 117.

During light load operation of the engine, the cams 114 and 115 engage rollers 118 and 119 on the rocker arms 106 and 107 to actuate the gas and air valves 104 and 105 respectively at proper times to admit gas to the air branch manifold 102 and a mixture of gas and air to the cylinder 100. It will be observed that the lobe of the air cam 115 is longer circumferentially than the lobe of the gas cam 112 and that it starts earlier and extends later. This assures that the air manifold is open to the cylinder before the gas manifold and that air alone continues to flow into the cylinder after the gas manifold is closed thus preventing an explosive mixture from existing in the air branch manifold 102. Under a heavy load it is, of course, necessary that a proportionately greater volume of gas and air should both be admitted into the cylinder for each cycle. The heavy load gas and air cams 113 and 116 therefore each have longer lobes than their respective light load cams 112 and 115.

Figure 2:
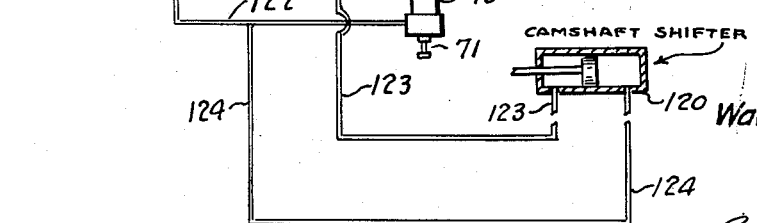
Fig. 2 is a fragmentary circuit diagram including portions of the apparatus illustrated in Fig. 1, as modified for the control of a supercharged gas engine employing a cam shaft shifting mechanism.

In a shifted cam shaft engine a cylinder 120 is provided from shifting the cam shafts 114 and 117 longitudinally to place the proper set of cams in contact with the rocker arm rollers 118 and 119. The cylinder 120 is actuated by the same fluid employed to actuate the double acting cylinder 70 and thus the vertically shiftable fulcrum rod 65. In Fig. 2 a fragmentary circuit is shown illustrating the changes necessary in the circuit of Fig. 1 to provide for the actuation of the cam shaft shifter cylinder 120 and corresponding actuation of the fulcrum shifting rod 65. A conduit line 121 connects the upper end of a double acting cylinder 70a to the lower port 94 (Fig. 5) of a shifting valve 81a. Similarly a second conduit line 122 connects the bottom of the double acting cylinder 70a to the upper port 93 of the valve 81a. These connections are reversed from those shown in Fig. 1 and from those employed with an engine not having a cam shaft shifter. A conduit line 123 is connected to the line 121 and to the cam shaft shifter cylinder 120. A second similar line 124 is connected to the line 122 and to the other side of the shifting cylinder 120.

In an engine employing a cam shaft shifting apparatus because of the greater duration of the open time of the two air and gas valves, a greater load can be carried by the engine at lower gas and air manifold pressures. Fig. 8 is a graph of the ratio between gas and air manifold pressures in an engine equipped with a cam shaft shifter and with control apparatus embodying the invention. As in the case of the operation of the engine using air and gas in the ratios shown in Fig. 7, the rate of change of air manifold pressure for a given change of gas manifold pressure varies between a light load (negative air manifold pressure) and a heavy load (positive air manifold pressure). Operation according to the invention again is controlled by a particular air manifold pressure point.

*Operation of shifting cam shaft engine*

When the pressure in the air manifold 12 is below zero it is insufficient to depress the diaphragm 88 (Fig. 5) and, therefore, the plunger 82 is in its upper position connecting the pressure line 92 to the port 94 and to the line 121 (Fig. 2) leading to the upper end of the double acting cylinder 70a. The fulcrum shifting rod 65, therefore is located at its lower position and the fulcrum pin 61 is lower in the slot 60 of the balancing lever 59. The lever arms of the lever 59 are more nearly equal and, therefore, an increment of increase in gas pressure in the gas pressure dome 51 can only be overcome by a substantially equal increment of air pressure in the air pressure dome 57.

When the load on the engine increases and the governor opens the gas butterfly 15 to increase the gas manifold pressure, the gas diaphragm 50 is moved to the right connecting the line 34 with the line 35 and actuating the air servomotor 21 to open the air butterfly 20. This operation is the same as in the case of the nonshifting cam shaft engine. The increase in air manifold pressure actuates the air diaphragm 56 to thrust the rod 43 and pilot valve 33 back to neutral. By reason of the fulcrum pin 61 being lower with respect to the lever 59, however, a greater change in air pressure is required than is the case with the fulcrum pin in its upper position, in order to balance a given increase in gas pressure.

When the air manifold pressure passes zero the diaphragm 88 is depressed thrusting the plunger 82 to its lower position and connecting the supply line 92 to the port 93 (Fig. 5) and to the conduit line 122 (Fig. 2). This raises the fulcrum shifting rod 65 to its upper position giving the air diaphragm 66 a greater leverage. This results in a lesser increment of increase in air pressure being able to counterbalance an increment of increase in gas pressure.

*Cam shaft shifter operation*

Because the lines 123 and 124 to the shifter cylinder 120 are connected in parallel with the conduit lines 121 and 122, respectively, leading from the valve 81a to the actuating cylinder 70a for the fulcrum shifting rod, the two sets of cams 110 and 111 are shifted from "light" position to "heavy" position simultaneously with the shifting of the position of the fulcrum pin 61. As can be seen in Fig. 8 at the time of the shift of the cams and the fulcrum position, the ratio between increases in gas pressure and increases in air pressure is changed so that equal increments of increase in gas pressure are counterbalanced by lesser increments of increase in air pressure. Lesser increments of increase of air pressure for equal increases in gas pressure maintain the correct fuel air ratio because of the longer "open" times for the valves resulting from the employment of the "heavy load" cams 113 and 116.

The invention has been disclosed in connection with an engine operated at low loads with natural aspiration and supercharged at higher loads, as is evident from the designation of both negative and positive air manifold pressures. It is, of course, applicable to engines operated only with natural aspiration or only supercharged. It will be appreciated that numerous modifications and changes may be made without departing from the spirit of the appended claims.

Having described the invention, I claim:

1. In an air-fuel ratio control mechanism for an internal combustion engine operating on a primarily gaseous fuel and having separately controllable air and gas manifolds, in combination, means responsive to the pressure in said fuel manifold, means responsive to the pressure in said air manifold, an engine driven governor controlling the pressure in one of said manifolds and pressure control means actuated by the combined response of said pressure responsive means for controlling the pressure in the other of said manifolds.

2. In an air-fuel ratio control mechanism for an internal combustion engine operating on a primarily gaseous fuel and having separately controllable air and gas manifolds, in combination, means responsive to the pressure in said fuel manifold, means responsive to the pressure in said air manifold, an engine driven governor controlling the pressure in said gas manifold and pressure control means actuated by the combined response of said pressure responsive means for controlling the pressure in said air manifold.

3. In an air-fuel ratio control mechanism for an internal combustion engine operating on a primarily gaseous fuel and having separately controllable air and gas manifolds, in combination, means responsive to the pressure in said fuel manifold, means responsive to the pressure in said air manifold, an engine driven governor controlling the pressure in one of said manifolds, a pilot valve, a servomotor controlled by said pilot valve, means operated by said servomotor for controlling the pressure in the other of said manifolds and means actuated by the combined response of said pressure responsive means for actuating said pilot valve.

4. In an air-fuel ratio control mechanism for an internal combustion engine operating on a primarily gaseous fuel and having separately controllable air and gas manifolds, in combination, means responsive to the pressure in said fuel manifold, means responsive to the pressure in said air manifold, an engine driven governor controlling the pressure in said gas manifold, a pilot valve, a servomotor controlled by said pilot valve, means operated by said servomotor for controlling the pressure in said air manifold and means actuated by the combined response of said pressure responsive means for actuating said pilot valve.

5. In an air-fuel ratio control mechanism for an internal combustion engine operating on a primarily gaseous fuel and having separately controllable air and gas manifolds, in combination, means responsive to the pressure in said fuel manifold, means responsive to the pressure in said air manifold, an engine driven governor controlling the pressure in said gas manifold and mechanism including variable ratio means actuated jointly by said air pressure responsive means and by said gas pressure responsive means for controlling the pressure in said air manifold.

6. In an air-fuel ratio control mechanism for an internal combustion engine operating on a primarily gaseous fuel and having separately controllable air and gas manifolds, in combination, means responsive to the pressure in said fuel manifold, means responsive to the pressure in said air manifold, an engine driven governor controlling the pressure in said gas manifold, a pilot valve, a servomotor controlled by said pilot valve, means operated by said servomotor for controlling the pressure in said air manifold, a pilot valve actuator, balancing lever means urged in one direction by said air pressure responsive means and urged in the other direction by said gas pressure responsive means and means operatively connecting said actuator to said lever means.

7. Mechanism in accordance with claim 6 in which said balancing lever has a variable fulcrum for varying the ratio of response thereof to said air and gas pressure responsive means.

8. Mechanism in accordance with claim 7 and means responsive to the pressure in said air manifold for shifting the fulcrum of said balancing lever.

9. Mechanism according to claim 8 in which the fulcrum shifting air pressure responsive means is actuated upon the reaching of a predetermined air pressure and the balancing lever fulcrum is shiftable thereby between a first position establishing a certain ratio between the response of said lever to air pressure and to gas pressure and a second position establishing another ratio therebetween.

10. In an air-fuel ratio control mechanism for an internal combustion engine operating on a primarily gaseous fuel and having separately controllable air and gas manifolds, in combination, an engine driven governor controlling the flow and thus the pressure in said gas manifold in response to variations in load on said engine, a valve in said air manifold for controlling the flow and thus the pressure of air therein, a servomotor for actuating said valve, a pilot valve for said servomotor, a pressure balancing lever operatively connected to said pilot valve, pressure responsive means communicating with said gas manifold and connected to urge said balancing lever in one direction in response to gas pressure, and a second pressure responsive means communicating with said air manifold and connected to urge said balancing lever in the opposite direction in response to air pressure.

11. In an air-fuel ratio control mechanism for an internal combustion engine operating on a primarily gaseous fuel and having separately controllable air and gas manifolds, in combination, an engine driven governor controlling the flow and thus the pressure in said gas manifold in response to variations in load on said engine, a valve in said air manifold for controlling the flow and thus the pressure of air therein, a servomotor for actuating said valve, a pilot valve for said servomotor, a pressure balancing lever operatively connected to said pilot valve, pressure responsive means communicating with said gas manifold and connected to urge said balancing lever in one direction in response to gas pressure, a fulcrum for said balancing lever, means for mounting said fulcrum in either of two spaced positions whereby the lever arms of said gas pressure and air responsive means thereon and the ratio of response of said lever to such pressures are variable between two selected ratios and means responsive to air manifold pressure and actuated at a predetermined pressure for shifting said fulcrum from one to the other of said spaced positions.

No references cited.